United States Patent [19]
Eckstine et al.

[11] Patent Number: 6,067,024
[45] Date of Patent: May 23, 2000

[54] OBSTACLE AVOIDANCE AND CRUSHING PROTECTION SYSTEM FOR OUTRIGGERS OF A CHASSIS

[75] Inventors: Dennis W. Eckstine, Waynesboro, Pa.; William W. Banks, New Market, Md.

[73] Assignee: Grove U.S. L.L.C., Shady Grove, Pa.

[21] Appl. No.: 09/205,291

[22] Filed: Dec. 4, 1998

Related U.S. Application Data

[60] Provisional application No. 60/067,815, Dec. 5, 1997, and provisional application No. 60/069,055, Dec. 10, 1997.

[51] Int. Cl.[7] .................................................. G08B 21/00
[52] U.S. Cl. ........................ 340/679; 340/685; 212/276; 212/277; 212/271
[58] Field of Search .................................. 340/679, 685, 340/540, 541; 212/276, 277, 278, 279, 280, 281, 271

[56] References Cited

U.S. PATENT DOCUMENTS

| | | | |
|---|---|---|---|
| 4,571,695 | 2/1986 | Elton et al. | 364/550 |
| 4,585,071 | 4/1986 | Anderson et al. | 172/1 |
| 4,833,615 | 5/1989 | Bitner et al. | 364/463 |
| 4,953,141 | 8/1990 | Novak et al. | 367/108 |
| 5,060,205 | 10/1991 | Phelan | 367/98 |
| 5,087,119 | 2/1992 | Kaneko et al. | 250/201.6 |
| 5,255,561 | 10/1993 | Fleming et al. | 73/146 |
| 5,267,016 | 11/1993 | Meinzer et al. | 356/358 |
| 5,519,400 | 5/1996 | McEwan . | |
| 5,521,600 | 5/1996 | McEwan . | |
| 5,580,095 | 12/1996 | Fukumoto | 280/840 |
| 5,581,256 | 12/1996 | McEwan . | |
| 5,659,321 | 8/1997 | Burger et al. | 342/124 |
| 5,869,967 | 2/1999 | Straus | 324/326 |

FOREIGN PATENT DOCUMENTS

| | | |
|---|---|---|
| 0033165 | 8/1981 | European Pat. Off. . |
| 2417467 | 9/1979 | France . |
| 19525673 C1 | 10/1996 | Germany . |
| WO9727139 | 7/1997 | WIPO . |
| WO9745358 | 12/1997 | WIPO . |

OTHER PUBLICATIONS

"Micropower Impulse Radar (MIR) Technology Overview," Site visited Dec. 29, 1996.

*Primary Examiner*—Nina Tong

[57] ABSTRACT

The protection system for outriggers of a chassis includes a non-contact distance measuring device, associated with at least one of the outriggers and the chassis, mounted on one of the outriggers and the chassis. The non-contact distance measuring device measures the distance to the ground along a predetermined angle, and generates a warning signal based on the measured distance. A controller stops operation of the outriggers in response to the warning signal.

12 Claims, 2 Drawing Sheets

OBSTACLE AVOIDANCE AND CRUSHING PROTECTION SYSTEM FOR OUTRIGGERS OF A CHASSIS

This Application has claimed the benefit under 35 U.S.C. 119 (e) of the provisional Application 60/067,815 filed Dec. 5, 1997 and 60/069,055 filed Dec. 10, 1997.

BACKGROUND OF THE INVENTION

1. Field of the Invention

The present invention relates to devices for cranes and aerial work platforms; and more particularly, to an obstacle avoidance and crushing protection system for outriggers.

2. Description of Related Art

Many types of conventional cranes and aerial work platforms use outriggers to stabilize and level the chassis of the crane or aerial work platform prior to a lifting operation. An outrigger control mechanism extends the outriggers towards the ground, and performs the stabilizing and leveling operation. During this operation, obstacles in the path of a deploying outrigger can become crushed or cause the crane or aerial work platform to achieve a dangerously unstable position. Accordingly, a need exists for an obstacle avoidance and crushing protection system for outriggers.

SUMMARY OF THE INVENTION

The protection system for outriggers of a chassis according to the present invention includes at least one non-contact distance measuring device mounted on one of an outrigger and the chassis. The non-contact distance measuring device is associated with at least one of the outriggers, and measures a distance to the ground along a predetermined angle. If the distance measured by the non-contact distance measuring device is less than a base distance measurement by more than a predetermined value, the non-contact measuring device generates a warning signal. The base distance measurement is the distance measurement the non-contact distance measuring device expects to make if an obstacle is not present between the outrigger and the ground. Alternatively, the warning signal is generated when the measured distance is less than a predetermined threshold value equal to the base distance measurement minus the predetermined threshold value.

In response to the warning signal, a controller causes the outrigger control mechanism to stop deployment of the outriggers. In this manner, the present invention assists an operator in preventing an outrigger from detrimentally coming in contact with an obstacle.

Other objects, features, and characteristics of the present invention; methods, operation, and functions of the related elements of the structure; combination of parts; and economies of manufacture will become apparent from the following detailed description of the preferred embodiments and accompanying drawings, all of which form a part of this specification, wherein like reference numerals designate corresponding parts in the various figures.

BRIEF DESCRIPTION OF THE DRAWINGS

The present invention will become more fully understood from the detailed description given hereinbelow and the accompanying drawing which is given by way of illustration only, and thus are not limitative of the present invention, and wherein.

DETAILED DESCRIPTION OF THE PREFERRED EMBODIMENTS

Figure 1A:
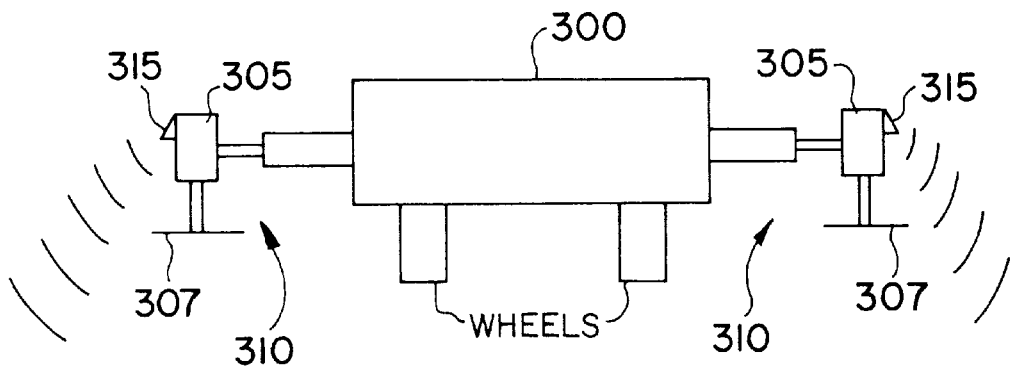
FIGS. 1A–1C illustrate embodiments of an obstacle avoidance and crushing protection system for outriggers of a crane or aerial work platform according to the present invention.
Figure 1B:
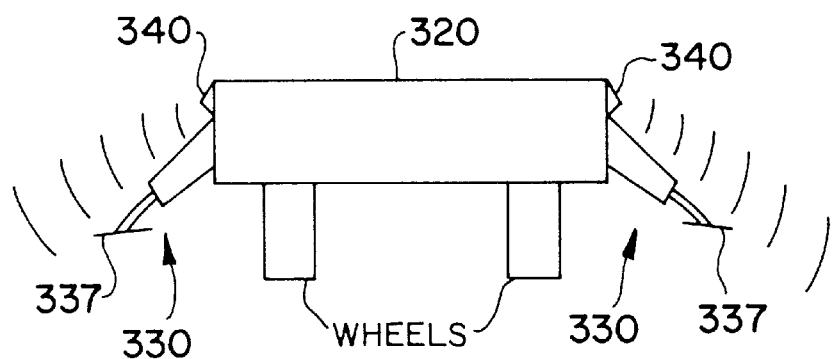
Figure 1C:
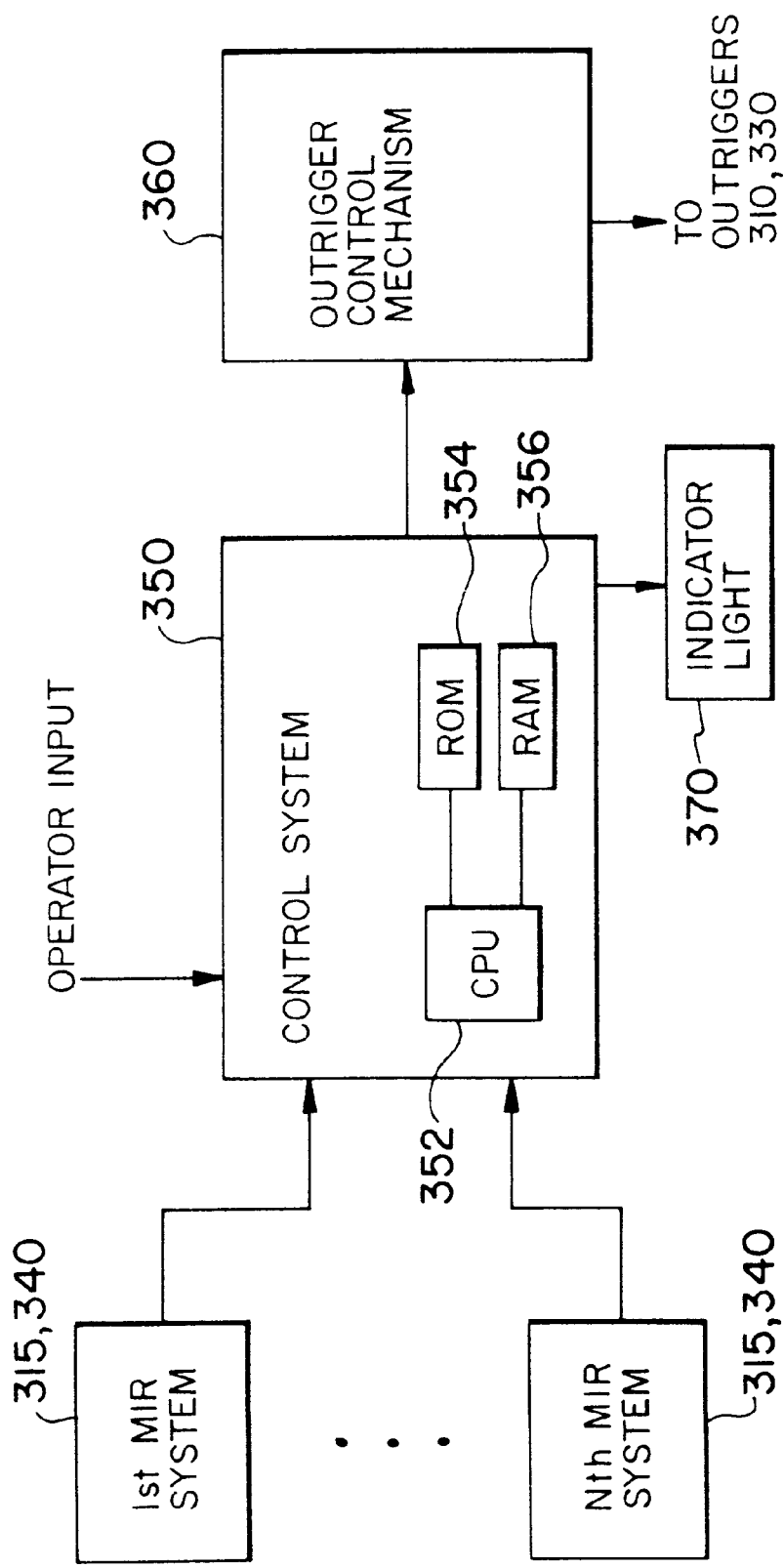

FIGS. 1A–1C illustrate embodiments of obstacle protection systems for outriggers of a crane or aerial work platform according to the present invention. FIG. 1A illustrates an aerial work platform or crane chassis 300 having vertical outriggers 310. An MIR system 315 is mounted on the cylinder 305 of each outrigger 310. As is well-known, MIR systems emit short-range ultra-wideband pulses, and detect the reflection of these pulses off of a body. Based on the reflected pulses, namely, the time delay between transmission and reception of the pulses, the MIR systems determine, among other things, the distance to the body. Each MIR system 315 is mounted such that the antennas thereof emit pulses at a predetermined angle from the respective cylinder 305. The predetermined angle is set such that the pulses do not reflect off of the foot 307 of the corresponding outrigger 310, but, in the absence of any obstacles, do reflect off of the ground.

FIG. 1B illustrates an aerial work platform or crane chassis 320 having oblique outriggers 330. An MIR system 340 is mounted on the chassis 320 next to each outrigger 330. As shown in FIG. 1B, each MIR system 340 is mounted such that the antennas thereof emit pulses at a predetermined angle from the chassis 320. The predetermined angle is substantially the same as the angle formed by the corresponding outrigger 340 with the chassis 320, but differs enough so that the emitted pulses do not reflect off of the foot 337 of the corresponding outrigger 330 and, in the absence of any obstacles, do reflect off of the ground.

Because the distance between each MIR system 315 or 340 and the ground (i.e., the bottom of the wheels) is known and the pulse emission angle is predetermined (i.e., known), the distance measured by each MIR system 315 or 340 when no obstacles are present is also known (ignoring variation in terrain). Hereinafter, this known distance measurement will be referred to as the base measurement. Alternatively, the base measurement is empirically determined.

The MIR systems 315 and 340 are calibrated to output a warning signal when the distance measured is less than the base measurement by a first predetermined distance or less than a first predetermined threshold equal to the base measurement minus the first predetermined distance. The warning signal indicates the presence of an obstacle.

While FIGS. 1A and 1B illustrate only two outriggers, it should be understood that a crane or aerial work platform may have any number n of outriggers with an MIR system corresponding to each outrigger.

FIG. 1C illustrates the processing section of the obstacle avoidance and crushing protection system for outriggers. As shown in FIG. 1C, a control system 350 receives the warning signals output from the n MIR systems, and operator input regarding the operation of the outriggers 310 or 340. The control system 350 includes a processor 352 connected to a ROM 354 and a RAM 356. Based on the warning signals and the user input, the control system 350 generates control signals, and outputs the control signals to an outrigger control mechanism 360. The outrigger control mechanism 360 is any well-known mechanism for controlling the outriggers 310 or 330. Based on the control signals, the outrigger control system 360 controls the operation of the outriggers 310 or 340.

When the control system 350 receives a warning signal from one of the MIR systems 315 or 340, the control system 350 illuminates an indicator light 370 and instructs the outrigger control system to halt movement of the outriggers 310 or 330.

Instead of using MIR systems to detect the obstacle, any device which measures the distance to a body or surface without relying on contact such as sonic, ultra-sonic, infra-red and laser distance measuring devices, may be used.

While the embodiment of the present invention discussed above activates an indicator light, in addition or instead of the indicator light, warning sounds may be issued.

The invention being thus described, it will be obvious that the same may be varied in many ways. Such variations are not to be regarded as a departure from the spirit and scope of the invention, and all such modifications as would be obvious to one skilled in the art are intended to be included within the scope of the invention.

What is claimed:

1. A protection system for outriggers of a chassis, comprising:
    a non-contact distance measuring device, associated with at least one outrigger of a chassis, mounted on one of the outriggers and the chassis, measuring a distance to the ground along a predetermined angle, and generating a warning signal based on the measured distance;
    a controller stopping operation of the outrigger in response to the warning signal.

2. The system of claim 1, wherein the non-contact distance measuring device is a micro-impulse radar.

3. The system of claim 1, wherein the non-contact distance measuring device is a sonic distance measuring device.

4. The system of claim 1, wherein the non-contact distance measuring device is an ultrasonic distance measuring device.

5. The system of claim 1, wherein the non-contact distance measuring device is an infra-red distance measuring device.

6. The system of claim 1, wherein the non-contact distance measuring device is a laser distance measuring device.

7. The system of claim 1, wherein the non-contact distance measuring device compares the measured distance to a predetermined threshold, and generates the warning signal when the measured distance is less than the predetermined threshold.

8. The system of claim 1, wherein the non-contact distance measuring device determines a difference as the measured distance minus a base distance, the base distance representing an expected value of the measured distance when the chassis is over a substantially smooth surface, and the non-contact distance measuring device generates the warning signal when the difference is less than a predetermined threshold.

9. The system of claim 1, further comprising:
    an indicator; and wherein
    the controller drives the indicator in response to the warning signal.

10. The system of claim 1, wherein the non-contact distance measuring device is mounted on the outrigger.

11. The system of claim 1, wherein the non-contact distance measuring device is mounted on the chassis next to the outrigger.

12. The system of claim 1, further comprising:
    a plurality of non-contact measuring devices, each non-contact measuring device associated with a respective outrigger of the chassis; and wherein
    the controller stops operation of the outriggers in response to at least one warning signal.

* * * * *